(12) United States Patent
Free et al.

(10) Patent No.: US 8,782,240 B2
(45) Date of Patent: Jul. 15, 2014

(54) RESOURCE ALLOCATION USING SHARED RESOURCE POOLS

(75) Inventors: James Douglas Free, Thornton, CO (US); Kenneth Owen Michie, Thornton, CO (US); Chandra Mouli Ravipati, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 259 days.

(21) Appl. No.: 13/079,593

(22) Filed: Apr. 4, 2011

(65) Prior Publication Data
US 2012/0096167 A1    Apr. 19, 2012

Related U.S. Application Data

(60) Provisional application No. 61/394,025, filed on Oct. 18, 2010.

(51) Int. Cl.
*G06F 15/173* (2006.01)
(52) U.S. Cl.
USPC .......................................... 709/226; 709/223
(58) Field of Classification Search
USPC .................................................. 709/226, 223
See application file for complete search history.

(56) References Cited

U.S. PATENT DOCUMENTS

| | | | | |
|---|---|---|---|---|
| 5,996,013 | A * | 11/1999 | Delp et al. | 709/226 |
| 7,260,060 | B1 * | 8/2007 | Abaye et al. | 370/230 |
| 7,512,683 | B2 * | 3/2009 | Anschutz et al. | 709/226 |
| 2002/0002609 | A1 * | 1/2002 | Chung et al. | 709/223 |
| 2003/0236854 | A1 * | 12/2003 | Rom et al. | 709/217 |
| 2006/0195578 | A1 * | 8/2006 | Ishida et al. | 709/226 |
| 2009/0037585 | A1 * | 2/2009 | Miloushev et al. | 709/226 |
| 2010/0278327 | A1 * | 11/2010 | Haserodt et al. | 379/221.07 |
| 2010/0325277 | A1 * | 12/2010 | Muthiah et al. | 709/226 |
| 2011/0134749 | A1 * | 6/2011 | Speks et al. | 370/217 |
| 2011/0231550 | A1 * | 9/2011 | Murray et al. | 709/226 |
| 2012/0044817 | A1 * | 2/2012 | Harper et al. | 370/252 |
| 2012/0166649 | A1 * | 6/2012 | Watanabe et al. | 709/226 |

FOREIGN PATENT DOCUMENTS

| | | |
|---|---|---|
| EP | 22773368 | 1/2011 |
| WO | WO 2009/140979 | 11/2009 |
| WO | WO 2011/115752 | 9/2011 |

OTHER PUBLICATIONS

Official Action for United Kingdom Patent Application No. GB1116830.9, dated Jan. 30, 2012 4 pages.

* cited by examiner

*Primary Examiner* — Ario Etienne
*Assistant Examiner* — Michael C Lai
(74) *Attorney, Agent, or Firm* — Sheridan Ross P.C.

(57) ABSTRACT

The present disclosure describes methods and systems for managing resources, for example in connection with call admission control or other communications or transactions in a system. In particular, a plurality of resource pools are established. At least a first or priority resource is associated with a minimum resource amount, while at least a second or normal resource pool is associated with a maximum resource amount. From the system resource pools, allocations are made to each of a plurality of system servers. If a server receives a request for priority resources that cannot be satisfied from the allocation of priority resources made to that server, that server may borrow from an allocation of normal resources. Resources can also be shared between servers. Accordingly, if required resources are not available from an allocation made to a server receiving the request for resources, that server can request resources from another server. In responding to a request to share resources, a server can attempt to fill the request as if the request had originally been made to that server.

15 Claims, 16 Drawing Sheets

RESOURCE ALLOCATION USING SHARED RESOURCE POOLS

CROSS-REFERENCE TO RELATED APPLICATIONS

This application claims the benefit of U.S. Provisional Patent Application Ser. No. 61/394,025, filed Oct. 18, 2010, the entire disclosure of which is hereby incorporated herein by reference.

FIELD

The disclosed invention is related to the sharing of resources between a plurality of resource allocation authorities.

BACKGROUND

Resource limited systems often can be sub-divided based on prioritization, sub-type, or quality of service or other considerations. For example, many computer and communication systems have a limited amount of bandwidth available for passing data between system components. In order to ensure desired quality of service levels, system bandwidth can be allocated preferentially to certain users or uses. Therefore, systems have been developed in which a certain proportion of available bandwidth is reserved for certain users or uses. However, this arrangement can result in available bandwidth going unused.

In various systems, and in particular in complex and/or in systems experiencing a high demand or handling a high volume of transactions, multiple servers or other authorities may be included. Where the overall system is associated with overall system resource limits, a central authority may need to be established in order to enforce those limits. Alternatively, overall system resource availability information can be distributed to all of the servers in the system. However, these solutions can result in systems that are complex to administer. In addition, such solutions can result in the need to allocate resources to accommodate network traffic associated with the administration of the system.

SUMMARY

The disclosed invention is directed to solving these and other problems and disadvantages of the prior art. Embodiments of the disclosed invention are applicable to any environment where resource allocation might be limited to prevent performance degradation. In accordance with embodiments of the disclosed invention, a resource limited system with distributed resource allocation control and with shared resource pools is provided. In general, the system includes a plurality of resource pools. At least one resource pool may have a maximum pool size that is equal to the total system resource capacity. A second pool included in the plurality of pools may have a maximum pool size that is less than the total resource capacity of the system. In addition, the system includes multiple authorities or servers. Resources from the pools are allocated among the included authorities.

In accordance with embodiments of the disclosed invention, each server maintains a record of the resources available with respect to each of the plurality of pools. More particularly, a record of the total amount of resources for a pool can be allocated by the server and the actual amount of resources allocated from that pool by the server is maintained by that server. In accordance with further embodiments of the disclosed invention, a first resource pool in the plurality of resource pools is a priority resource pool, and a server can borrow resources from the second, normal resource pool for allocation to the priority resource pool. In accordance with still other embodiments of the disclosed invention, an authority that is unable to fulfill a request for resources from resources currently allocated to that authority can request that one or more of the other authorities in the system share additional resources with the requesting authority.

Methods in accordance with embodiments of the present disclosure include defining a plurality of resource pools. As an example, the plurality of resource pools can include a first, priority resource pool, and a second, normal resource pool. The method includes permitting borrowing of resources from the normal resource pool for use by the priority resource pool. In addition, the method supports sharing resources between authorities within the system. Total system resources remain constant, and minimum resource allocations to priority resource pools can be enforced, even while permitting the borrowing and sharing of resources. Moreover, the inclusion of a central authority for enforcing limits and rules regarding the borrowing and sharing of resources is not required.

Additional features and advantages of embodiments of the present disclosure will become more readily apparent from the following description, particularly when taken together with the accompanying drawings.

DETAILED DESCRIPTION

Figure 1:
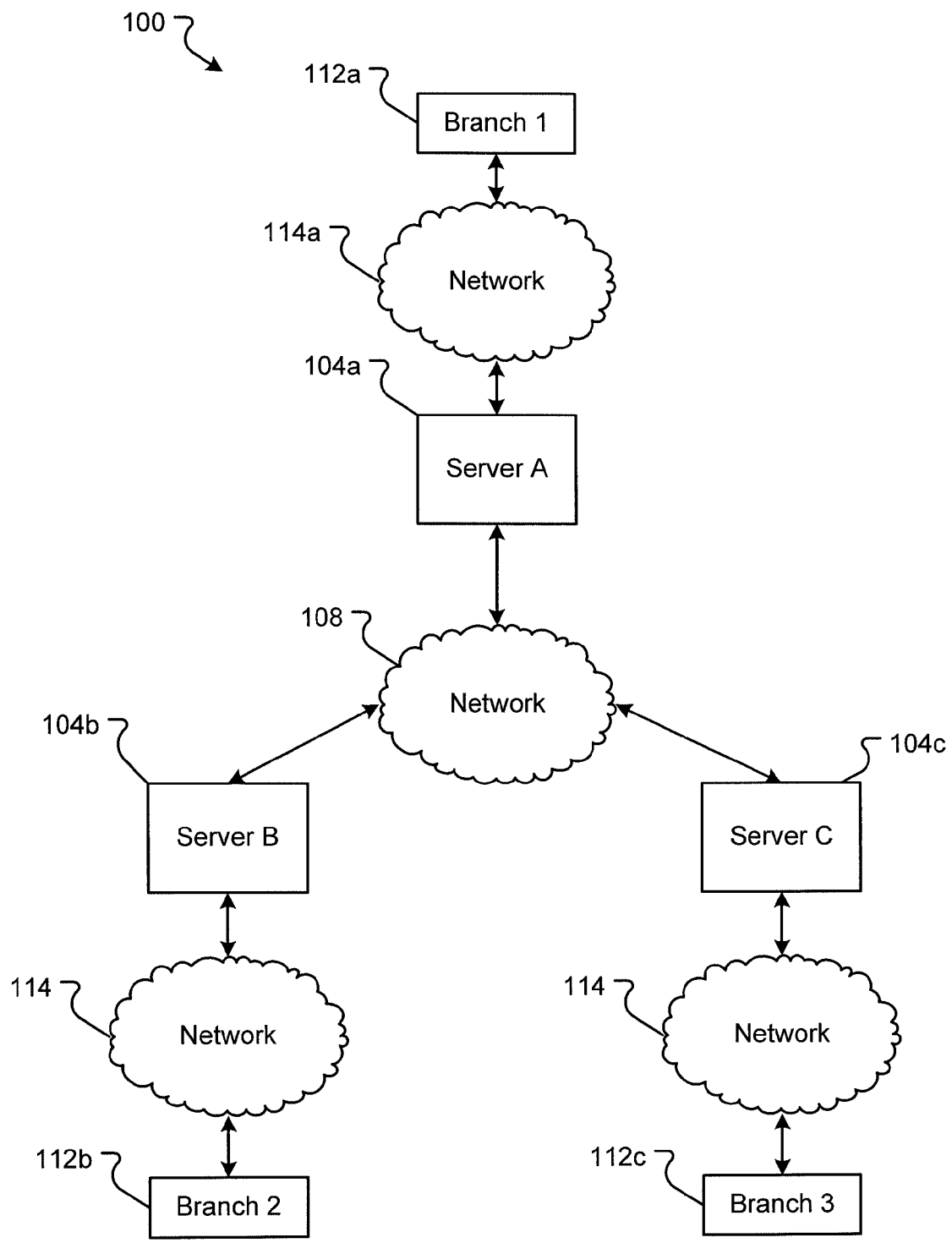
FIG. 1 depicts components of a distributed system in accordance with embodiments of the present disclosure.

A system with shared resource pools 100 in accordance with embodiments of the present disclosure is depicted in FIG. 1. Although portions of the description discuss the allocation of resources comprising computer or communications networks or processing resources, it can be appreciated after consideration of the present disclosure that embodiments of the present disclosure can be applied to any resource and to any environment where resource allocation might be limited. The components of the system 100 may be hardware, software, firmware, or the like, or combinations thereof. The system 100 includes a plurality of authorities or servers 104. Each server 104 is generally operable to administer resources, here bandwidth, in response to resource requests. Each server 104 may be in communication with the other servers 104 in the system 100, either directly or through a network 108. As an example, each server 104 may manage phone calls, or other communications or data transfers for an associated branch 112. Accordingly, a server 104 may comprise a communications server or session manager. A branch 112 may include a set of multiple resource users. For instance, in the case of a bandwidth user, a branch may include multiple communication devices. Examples of communication devices that may be included in a branch 112 include telephones, video phones, computers, or other communication devices. Therefore, an example branch 112 may be a call center or site of an enterprise network. Typically, but not necessarily, the branches 112 comprise a collection of Internet protocol (IP) addresses, telephone numbers, and/or other communication system identifiers or addresses. Moreover, each branch 112 may comprise or be interconnected to an associated server 104 directly or via a branch network 114. Although referred to herein separately, a branch network 114 may comprise or be interconnected to the communication network 108 interconnecting the servers 104. Accordingly, a network 108 or branch network 114 can comprise the Internet and/or a private intranet, wide area network, and/or local area network.

The system 100 manages communications or requests for bandwidth from one or more endpoints or nodes, including but not limited to communication devices, at one or more of the branches 112. As an example, a phone call may be requested from a first branch 112a. The request may be sent to server A 104a, which is the controller responsible for branch 1 112a over the interconnecting network A 114a. Before allowing the call to proceed, server A 104a must determine if the system 100 has enough bandwidth to permit the call. Generally, the system 100 is resource, e.g. bandwidth, limited. Therefore, in accordance with embodiments of the present disclosure, the system 100 administers bandwidth limits. In particular, different resource or bandwidth pools may be defined for different communications. Moreover, before a communication can proceed, a server 104 must grant the bandwidth required for the communication. Thus, each server 104 must be able to determine if the bandwidth required for a requested communication is available within the system 100. In accordance with embodiments of the present disclosure, system 100 resources can be divided according to the priority status of a user or the type of a communication that will use the requested resources. Therefore, this determination must also allocate between resources of different types or categories. For example, resources may be allocated between priority users and uses and normal users and uses. For instance, a priority user may be a user requiring bandwidth for an audio communication session, while a normal or non-priority user may be a user requiring bandwidth for an audio-video (hereinafter referred to simply as "video") communication.

Resources can also be categorized and assigned to different resource pools according to resource type. For example, the system 100 may be configured to allocate system resources from a first pool representing available resources belonging to a first pool before allocating resources belonging to a second pool. As an illustration of this, where the system 100 resource is electrical power, the first pool may comprise power from renewable energy resources, while the second pool may comprise power from a fossil fuel source. Moreover, additional pools (categories) of resources and/or users can be included in the system 100. For example, where the second pool is an allocation of electrical power from natural gas sources, a third pool may be an allocation of electrical power from coal sources. In the example of a system that supplies power, some minimum amount may be reserved for inclusion in a pool reserved for priority users (e.g., hospitals and other emergency devices), while a maximum that is less than the total system 100 resources may be a limit on power available to common users.

The system 100 resources or bandwidth is shared among the servers 104. For example, the servers 104 are allocated an amount of system 100 bandwidth. Moreover, an amount of bandwidth from each of a plurality of bandwidth pools may be allocated to each server 104. As each server 104 administers or controls a communication, a portion of the allocated bandwidth is employed. However, in some situations, a server 104 requires more bandwidth to satisfy a request (e.g., to administer a call) than that server has available from the associated bandwidth pool. In such a situation, the server 104 can reallocate bandwidth between pools through a borrowing procedure as disclosed herein. In addition, a server 104 can issue a request to other servers 104 to share system 100 bandwidth.

Figure 2:
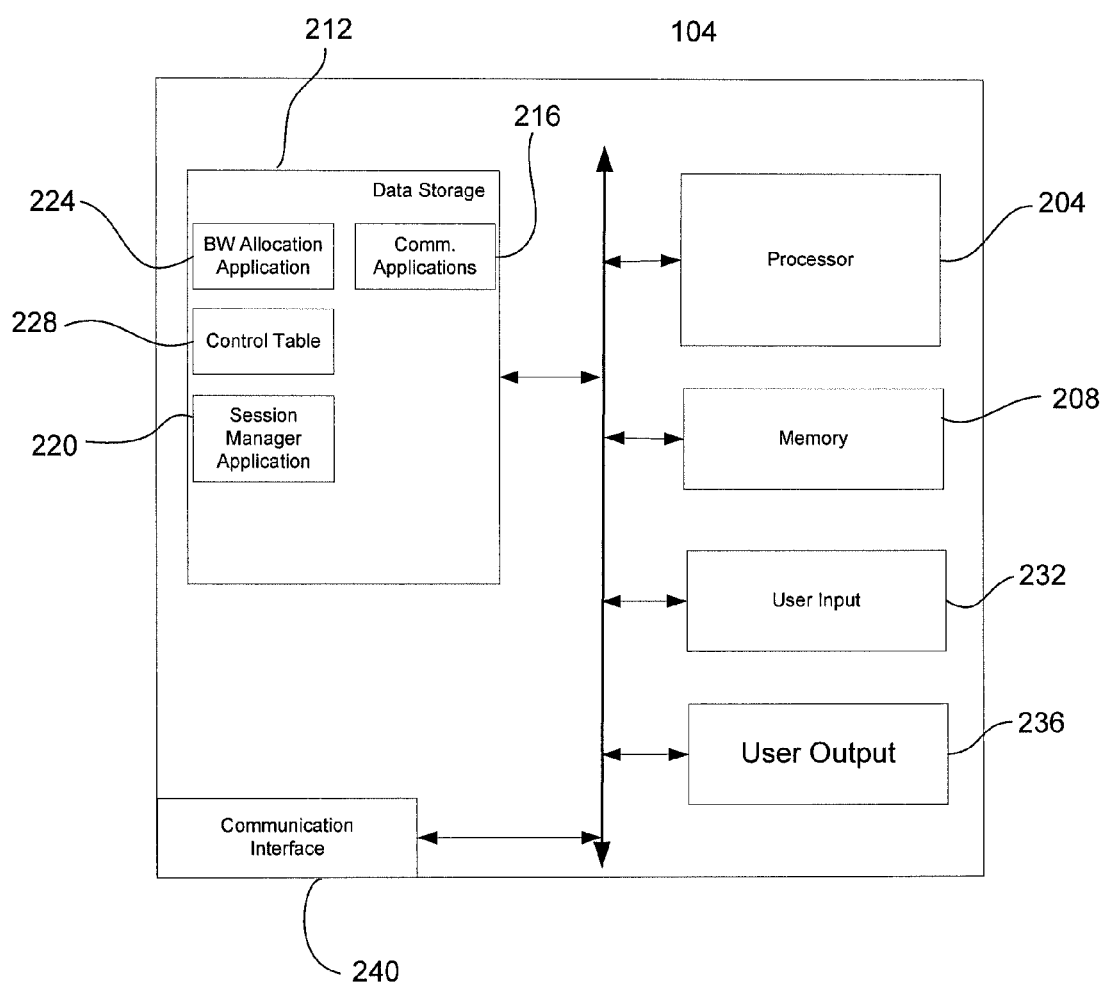
FIG. 2 depicts components of a server in accordance with embodiments of the present disclosure.

FIG. 2 is a block diagram depicting components of a server 104 in accordance with embodiments of the disclosed invention. In general, each server 104 includes a processer 204 capable of executing program instructions or software. Accordingly, the processor 204 may include any general purpose programmable processor or controller for executing application programming or instructions. As a further example, the processor 204 may comprise a specially configured application specific integrated circuit (ASIC). The processor 204 generally functions to run programming code or instructions implementing various functions performed by the server 104. As will be described in greater detail elsewhere herein, such functions may include the allocation of bandwidth from appropriate pools for use in connection with a communication session.

A server 104 may additionally include memory 208 for use in connection with the execution of programming by the processor 204, and for the temporary or long term storage of program instructions and/or data. As examples, the memory 208 may comprise RAM, SDRAM, or other solid state memory. Alternatively or in addition, data storage 212 may be provided. In accordance with embodiments of the present disclosure, data storage 212 can contain program code or instructions implementing various of the applications or functions executed or performed by the server 104, and data that is used and/or generated in connection with the execution of applications and/or the performance of functions. Like the memory 208, the data storage 212 may comprise a solid state memory device. Alternatively or in addition, the data storage 212 may comprise a hard disk drive or other random access memory.

Examples of application programming or instructions that can be stored in data storage 212 include various communication applications or applications for administering communications 216. Communications supported or administered by a server 104 can include, for example and without limitation, voice telephony, video telephony, email, instant messaging, or other communications. As another example, a server 104 data storage 212 can contain a session manager application 220, for example to provide the support for and services to in-progress communications sessions. In accordance with embodiments of the disclosed invention, data storage 212 of a server 104 includes a bandwidth or other resource allocation application 224. As disclosed herein, a bandwidth allocation application 224 operates to allocate or assign bandwidth from an appropriate pool to support requested communications. In addition, the bandwidth allocation application 224 in accordance with embodiments of the present disclosure supports the borrowing of bandwidth between bandwidth pools, and the sharing of bandwidth between servers 104. The data storage 212 can also include one or more control tables 228 for maintaining information regarding a status of bandwidth administered by the server 104. As discussed herein, such information can include a current allocation of bandwidth from a plurality of bandwidth pools, a maximum bandwidth allocation value for a plurality of bandwidth pools, and a value indicating an amount of borrowed bandwidth.

A server 104 can also include one or more user input devices 232. Examples of user input devices 232 include a touch screen display, keyboard, pointing device combined with a display screen or other position encoder, microphone or other audible input device, and keypad. In addition, a server 104 generally includes one or more user output devices 236. Examples of user output devices 236 include a display, an audio output device, and indicator lamps. User input 232 and user output devices 236 can be directly connected to the server 104, or can be provided by interconnected devices, for example to support remote administration of the server 104. A server 104 also generally includes one or more communication network interfaces 240. A communication network interface 240 generally functions to interconnect the server 104 to other servers 104 and to branch 112 devices directly or via one or more networks 108 and 114. Examples of communication network interfaces 240 that may be provided as part of a server 104 include a packet data network interface, such as a wired or wireless Ethernet interface, a telephony network interface, and/or other wireless or wire line interfaces.

Figure 3:
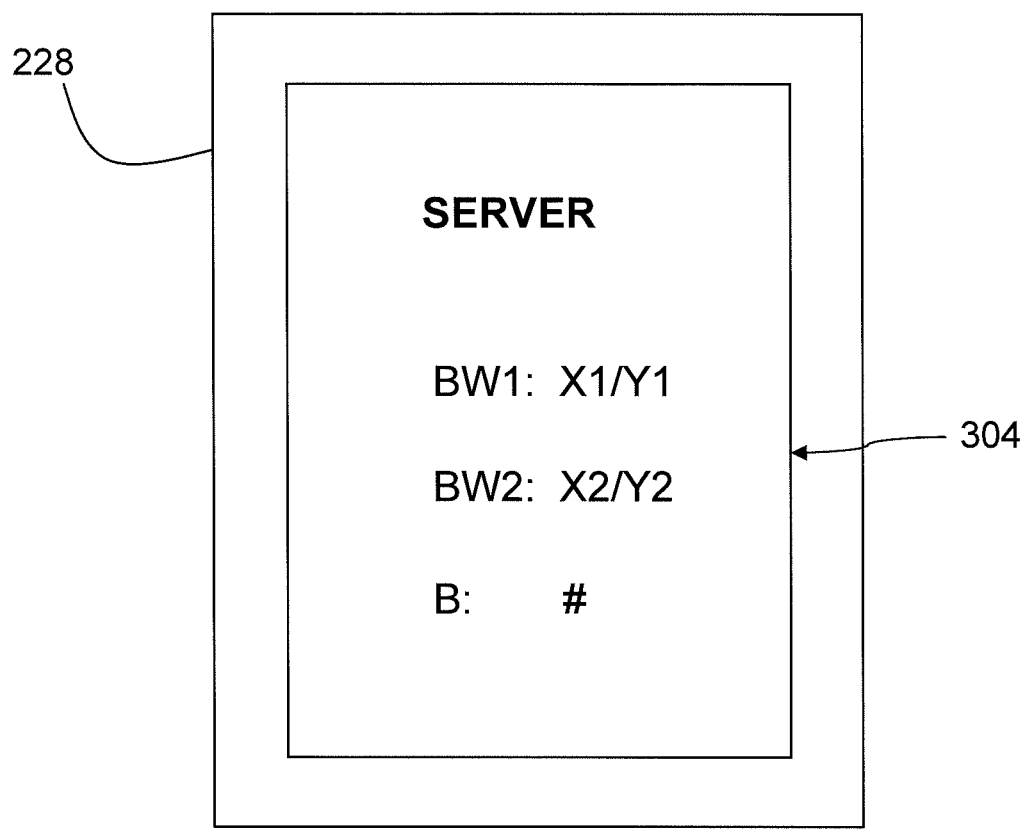
FIG. 3 depicts the contents of a bandwidth allocation control table maintained by a server in accordance with embodiments of the present disclosure.

FIG. 3 depicts the contents of a resource allocation control table 228 maintained by a server 104 in accordance with embodiments of the present disclosure. The control table 228 generally includes a resource (e.g., bandwidth) allocation table 304, that comprises a record of the current resource allocation and use associated with the server 104 on which the control table 228 is maintained. In particular, an allocation of resources with respect to different resource pools is recorded. In FIG. 3, allocations with respect to resources comprising two bandwidth pools, $BW_1$ and $BW_2$ are shown. For each bandwidth pool, the X/Y notation indicates the bandwidth from that pool that is in use (X) versus the total bandwidth in that pool available to the server (Y). The allocations of bandwidth to the pools (in this example $BW_1$ and $BW_2$) can be made to the servers 104 in the system 100 as part of an initial administration or provisioning process or step. As can be appreciated by one of skill in the art after consideration of the present disclosure, the allocation of bandwidth from the pools to individual servers 104 can be made such that the overall or global bandwidth of the system 100 is not exceeded. Moreover, minimum system 100 bandwidth allocations for a priority bandwidth pool (e.g., $BW_1$) is, in accordance with embodiments of the present disclosure, maintained. The bandwidth allocation record 304 also includes a borrowed (B) value, for tracking normal (e.g., $BW_2$) bandwidth that has been borrowed for use as part of the priority (e.g., $BW_1$) pool.

Figure 4:
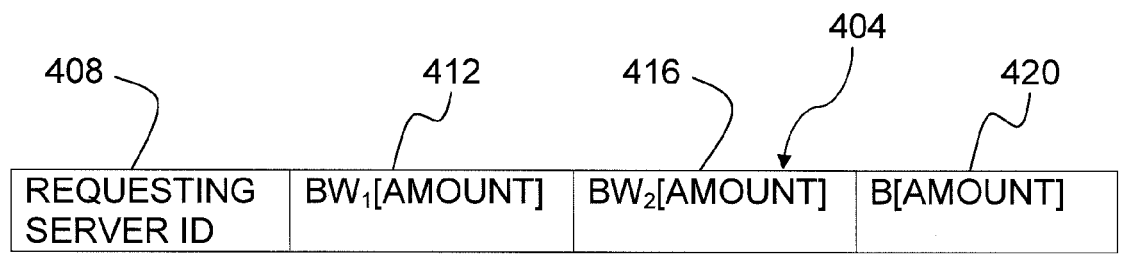
FIG. 4 is a depiction of the contents of a request for shared bandwidth in accordance with embodiments of the present disclosure.

Systems 100 in accordance with embodiments of the present invention also support the sharing of resources between servers 104. For example, where a request for bandwidth made to a first server 104 cannot be satisfied by that server, the first server 104 can request additional bandwidth from other servers 104 in the system. FIG. 4 depicts the contents of a request 404 for shared resources, in this example bandwidth, in accordance with embodiments of the present invention. In particular, the request 404 can include an identification of the requesting server 104 in a first field 408. In addition, the request 404 will contain a value indicating the amount of bandwidth for each bandwidth pool that the requesting server 104 can use, and an amount of borrowed bandwidth that the requesting server 104 can use. This can be indicated using the notation $\{BW_1, BW_2, B\}$ where $BW_1$ is a numeric value indicating an amount of bandwidth requested for allocation to the first pool, where $BW_2$ is a numeric value indicating an amount of bandwidth requested for allocation to the second pool, and where B is an amount of borrowed bandwidth that can be applied by the requesting server 104. These values can be zero or non-zero. For example, if the requesting server 104 requires priority bandwidth, a second field 412 will include a non-zero value, to indicate the amount of bandwidth from the first bandwidth pool that is required. If the requesting server 104 requires normal bandwidth, the request 404 will include a non-zero value in the second field 412, and a non-zero value in a third field 416, related to an allocation of bandwidth from the normal bandwidth pool. In connection with a request for bandwidth from the second or normal pool, the request 404 can include a zero or non-zero value in a fourth field 420, indicating an amount of borrowed bandwidth that the requesting server 104 could use in satisfying the request. As can be appreciated by one of skill in the art after consideration of the present disclosure, a request 404 can comprise a data packet or message sent between servers 104 within the system 100 across an interconnecting network 108.

Figure 5:
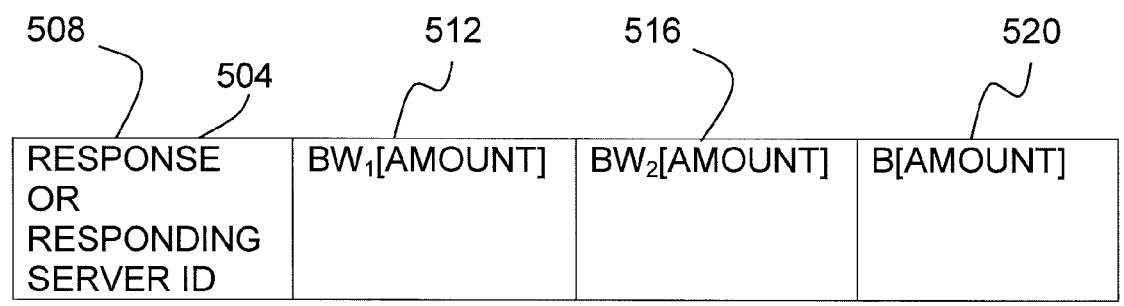
FIG. 5 is a depiction of the contents of a response to a request for shared bandwidth in accordance with embodiments of the present disclosure.

FIG. 5 is a depiction of the contents of a response 504 to a request for a shared resource, in this example bandwidth, in accordance with embodiments of the present invention. The response 504 can include an indication that the data is a response to a request for shared bandwidth, and can indicate the identity of the responding server 104 in a first field 508. Additional fields 512, 516, and 520 can contain bandwidth amounts that the responding server 104 can share in response to the request. For example, a second field 512 can indicate an amount of bandwidth from the first pool ($BW_1$) being shared, a third field 516 can indicate an amount of bandwidth being shared from the second pool ($BW_2$), and the fourth field 520 can indicate the amount of borrowed bandwidth (B) being shared. This can be indicated using the notation $\{BW_1, BW_2, B\}$, where BW1 in the response 504 is a numeric value indicating an amount of bandwidth provided from the first bandwidth pool, $BW_2$ is a numeric value indicating an amount of bandwidth provided from the second bandwidth pool, and B is a numeric value indicating an amount of borrowed bandwidth being provided by the responding server 104. These values can be zero or non-zero. Like the request 404, the response 504 can be communicated between servers 104 in the system 100 as a data packet or message carried by an interconnecting network 108.

Figure 6:
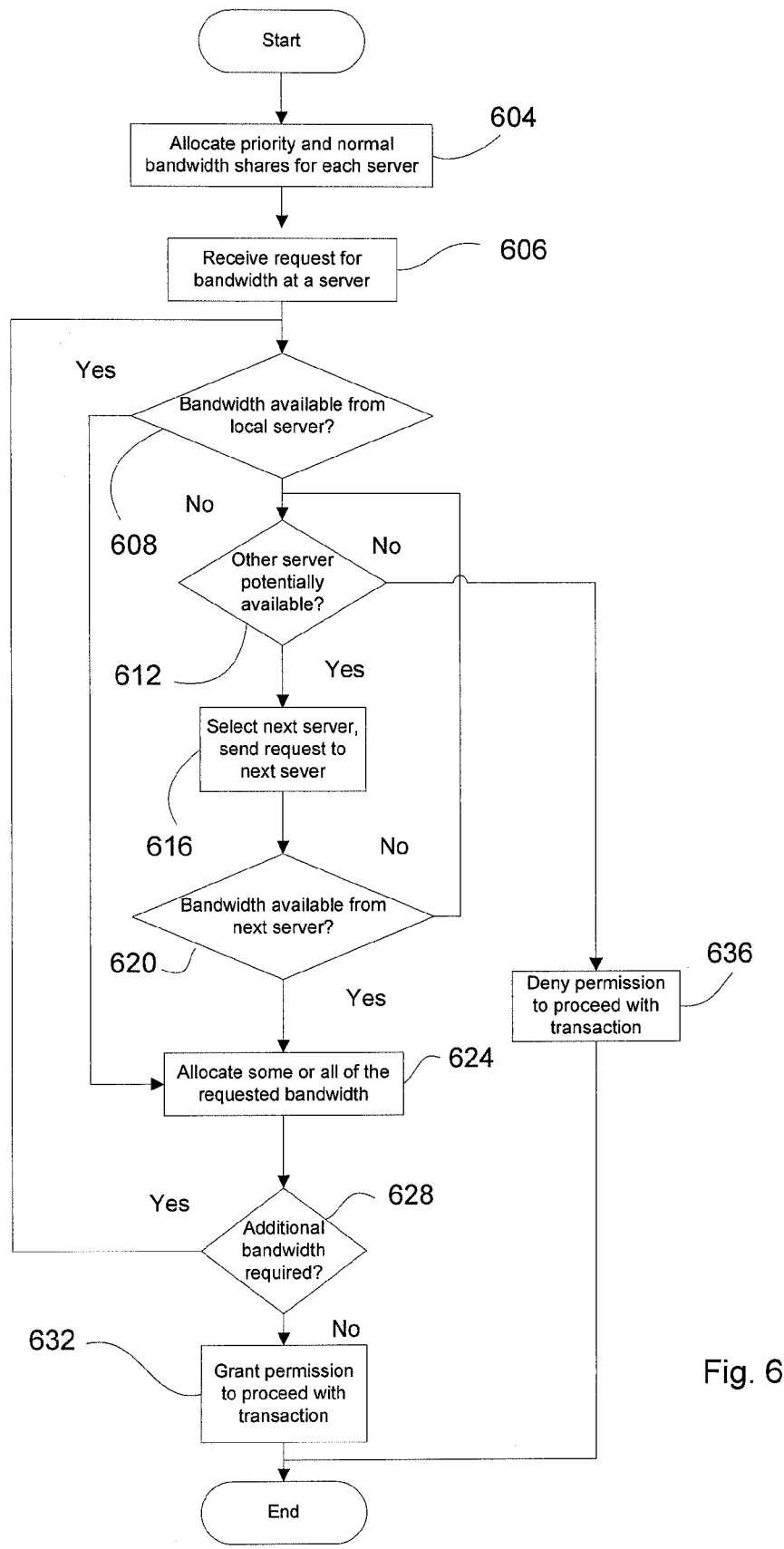
FIG. 6 is a flowchart depicting aspects of a method for fulfilling a request for bandwidth in accordance with embodiments of the present disclosure.

FIG. 6 is a flowchart depicting aspects of a method for fulfilling a request for resources (here bandwidth) in accordance with embodiments of the present disclosure. Initially, at step 604, bandwidth shares are allocated from the system 100 bandwidth pools to the servers 104. This can include providing each server 104 with a portion of each bandwidth pool associated with the system 100. Moreover, the bandwidth pools can include priority and normal bandwidth pools. In accordance with embodiments of the present disclosure, a priority bandwidth pool is associated with a minimum bandwidth value. The minimum bandwidth value for the priority bandwidth pool will always be maintained. Conversely, a normal bandwidth pool will have a maximum bandwidth value that can never be exceeded. However, embodiments of the disclosed system permit borrowing from the normal bandwidth pool to service priority bandwidth needs. Moreover, as described herein, the initial allocations of bandwidth to system 100 servers 104 need not be maintained during operation of the system 100. In particular, bandwidth in the various pools available to a server 104 at any particular point in time can differ from the initial allocations, as a result of bandwidth sharing between servers 104.

At step 606, a request for bandwidth is received at a server 104. As an example, and without limitation, the server 104 may comprise a communications server, and the request for bandwidth may be to support a communication in which a device or node included in the branch 112 serviced by the server 104 will be a participant. In response to the request, the server 104 initially determines whether the request for bandwidth can be satisfied from the bandwidth currently available on that server 104 (step 608). If it is determined that the server 104 cannot itself satisfy the request, a determination can next be made as to whether another server is potentially available (step 612). If another server 104 is potentially available (i.e., the requesting server 104 has not yet made a request to each server 104 in the system), the next additional server 104 is selected, and a request 304 for bandwidth is sent to the selected server 104 (step 616). A determination is then made as to whether bandwidth is available from that next server (step 620). If the requested bandwidth is not available, the process may return to step 612, and a request 304 can be sent to a next server 104, if available.

If it was determined at step 608 that bandwidth is available from the server 104 responsible for the branch 112 from which the request originated, or if it is determined at step 620 that bandwidth is available from another server 104, some or all of the requested bandwidth is allocated to service the original request (step 624). At step 628, a determination is made as to whether additional bandwidth is required in order to allow the communication or other transaction associated with the bandwidth request to proceed. If additional bandwidth is required, the process may return to step 608. If additional bandwidth is not required, the request for bandwidth made by the branch 112 is granted (step 632), and the communication or transaction requiring the bandwidth can proceed.

If it was determined at step 608 that required bandwidth is not available from the server 104 that received the request from the branch 112, and if it is also determined at step 612 that no other servers 104 are available to provide additional bandwidth, the request from the branch 112 is denied (step 636). After granting (step 632) or denying (step 636) the request, the process may end.

Figure 7:
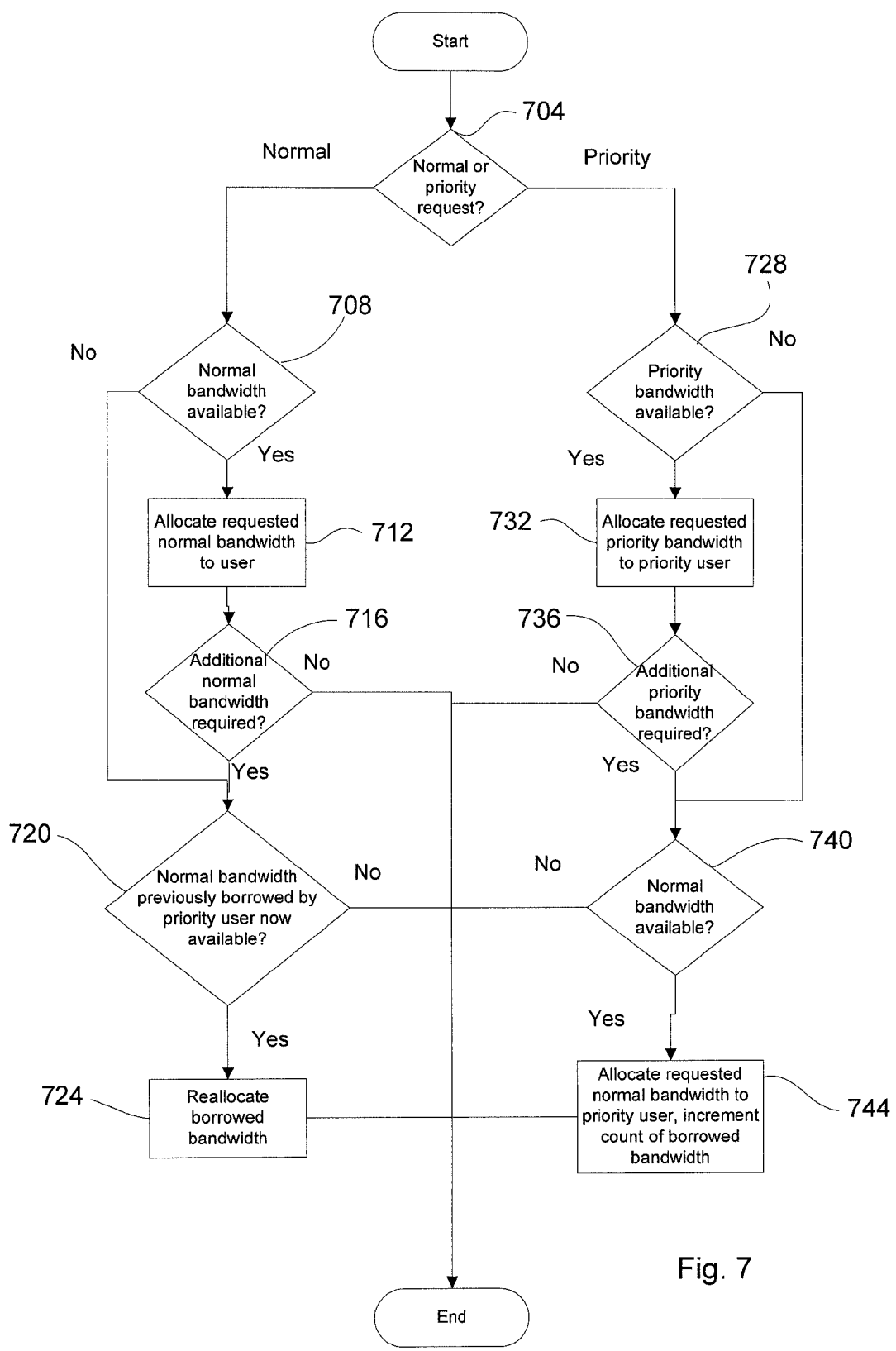
FIG. 7 is a flowchart depicting aspects of a method for reallocating bandwidth in accordance with embodiments of the present disclosure.

FIG. 7 is a flowchart depicting aspects of a method for reallocating a resource such as bandwidth in accordance with embodiments of the present disclosure. Initially, at step 704, a determination can be made by the server 104 receiving the request as to whether the request is for normal or priority bandwidth. That is, the identity of the bandwidth pool from which the request should be satisfied is determined. The server 104 receiving the request can be the server 104 responsible for the branch 112 from which the request was initiated. Alternatively, the server 104 can be a server 104 that received a request 304 for shared bandwidth from another server 104.

If the request comprises a request for normal bandwidth, a determination is made as to whether normal bandwidth shares are available (step 708). If normal bandwidth shares are available, the requested normal shares are allocated to the user (step 712). A determination can next be made as to whether additional bandwidth is required (step 716).

After determining at step 716 that additional normal bandwidth is required, or after determining at step 708 that a server does not have normal bandwidth available, a determination can be made as to whether normal bandwidth previously borrowed by a priority user is now available (step 720). If normal bandwidth previously borrowed by a priority user is now available, the previously borrowed normal bandwidth is reallocated (step 724). Accordingly, the previously borrowed normal shares are again made available as part of the normal bandwidth pool. After reallocating borrowed bandwidth shares, the process of reallocating within the subject server 104 can end.

If at step 704 the request for bandwidth was determined to be a request for priority bandwidth, a determination is made as to whether priority bandwidth is available (step 728). If priority bandwidth is available, the requested priority bandwidth is allocated or made available to the priority user or use (step 732). At step 736, a determination may be made as to whether additional priority bandwidth is required to satisfy the request. If additional priority bandwidth is not required, the process may end. If it is determined that additional priority bandwidth is required, or if it is determined that priority bandwidth is not available on the server 104, a determination may next be made as to whether normal bandwidth is available on the server 104 (step 740). If normal bandwidth is not available, the process may end. If normal bandwidth is available, the requested normal bandwidth is allocated to the priority user, and the count of borrowed bandwidth is incremented (step 744). In addition to incrementing the count of borrowed shares, the count of priority bandwidth is incremented by the amount borrowed, and the count of normal bandwidth is decremented by the amount borrowed. After determining at steps 716 or 736 that additional shares are not required, that normal bandwidth is not available at steps 720 or 740, or after reallocating or allocating shares at steps 724 or 744, the process may end.

The following examples are provided for purposes of illustration only and are not intended to limit the scope of the invention.

Example 1

Figure 8A:
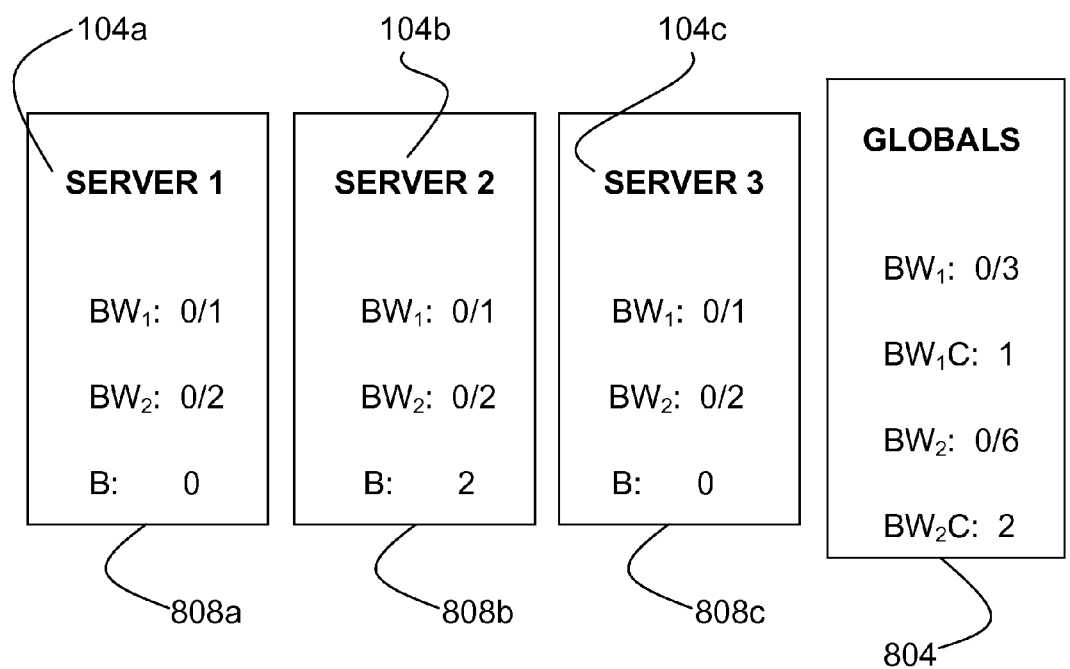
FIGS. 8A-J depict exemplary bandwidth allocations of servers in a system in accordance with embodiments of the present disclosure.

In this example, a base configuration or starting point for a resource comprising bandwidth allocations, as illustrated in FIG. 8A is referenced. In particular, that figure illustrates an initial global bandwidth allocation for first and second bandwidth pools, denoted $BW_1$ and $BW_2$ respectively. Moreover, the numerator of the value following the bandwidth pools indicates an amount of the allocation used, while the denominator of that value indicates the total bandwidth (i.e., the global or system 100 bandwidth) allocated to the pool. In addition, an indication of the cost of different transactions (e.g., calls) is given. In this example, the cost for a transaction requiring bandwidth from the first pool, $BW_1C$ is 1. Accordingly, a transaction requiring bandwidth from the first pool is associated with a cost of one unit of bandwidth from that pool. As an example, and without limitation, the first bandwidth pool $BW_1$ can comprise a priority pool, which is reserved for audio calls. Continuing this example, the second pool $BW_2$ in this example has a cost of two units of bandwidth, and in this example can correspond to a video call. Tables 808a, 808b and 808c illustrate the initial bandwidth allocations made to the servers 104 in the system 100. In particular, a value is given for the amount of bandwidth used from each of the two bandwidth pools by the individual servers 104. In addition, the total available bandwidth with respect to each of the bandwidth pools is indicated. Notably, the total system bandwidth (which is equal to the initial allocation of priority bandwidth, or five in this example, plus the initial allocation of normal bandwidth, four in this example, for a total of nine)

is not exceeded. In addition, each table 808 includes an indication of the amount of borrowed bandwidth (B).

Figure 8B:
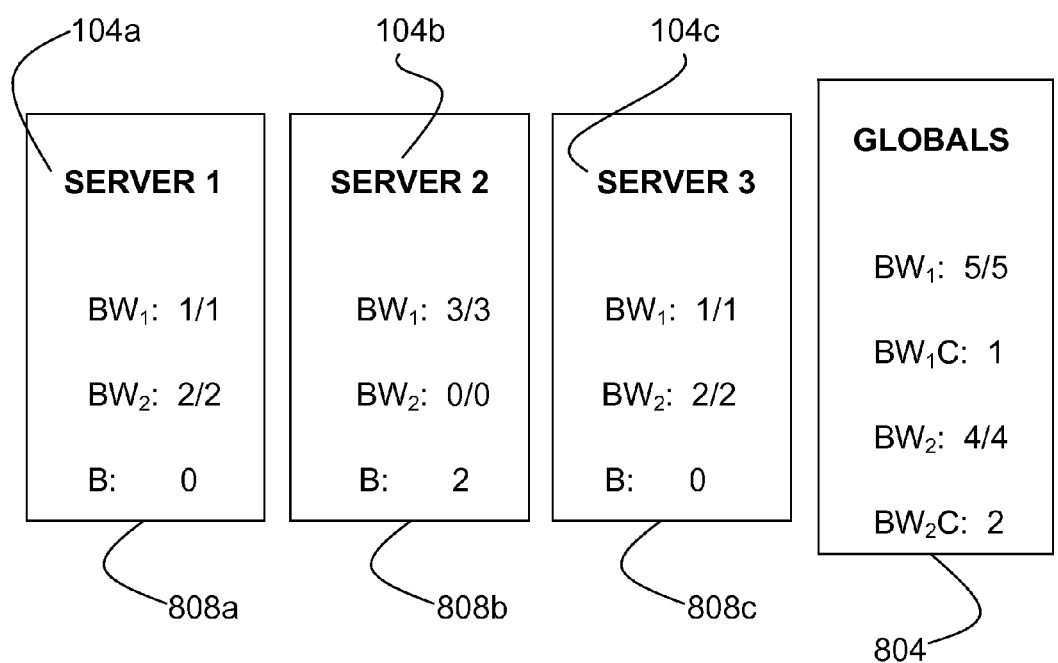

In FIG. 8B, an exemplary operating status of the system 100 is illustrated. In particular, all of the system 100 bandwidth is being fully utilized. In addition, borrowing of bandwidth from the second bandwidth pool $BW_2$ for use as part of the first bandwidth pool $BW_1$ has occurred.

Figure 8C:
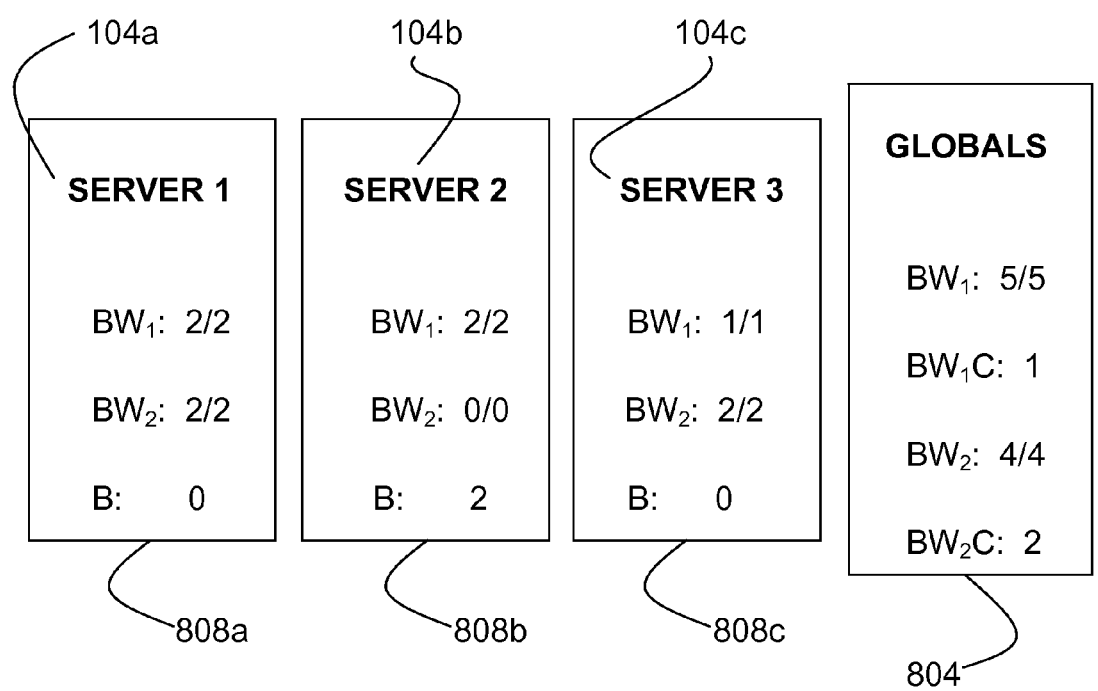

Starting from the configuration in FIG. 8B, in this first example server 2 104b has an audio call end, resulting in one unit of audio bandwidth ($BW_1$) becoming available. Server 1 104a now needs to make an audio call. In response to server 1 104a determining that it has no audio bandwidth available, it tries to borrow from its allocation of normal or video bandwidth ($BW_2$), but has nothing available there either. Accordingly, server 1 104a sends a request 404 to server 2 104b, with values of {1, 0, 0} (i.e., requesting one unit of priority bandwidth and zero units of normal or borrowed bandwidth). Server 2 104b sends a response 504 with the values {1, 0, 0}, indicating that it is giving one unit of bandwidth from the priority pool $BW_1$ to server 1 104a. Server 1 104a then uses the shared bandwidth to allow the call. The allocation of bandwidth across the system after the borrowing and utilization described in example 1 is illustrated in FIG. 8C.

Figure 8D:
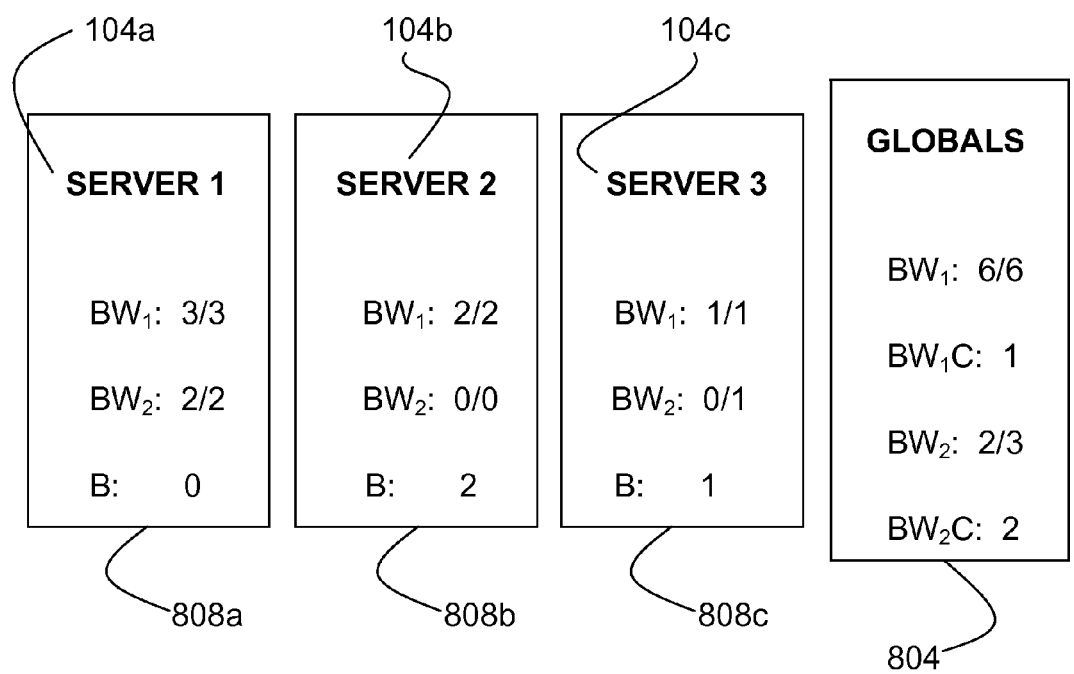

Continuing this example, a video call on server 3 104c ends. In addition, server 1 104a needs to make another audio call. Server 1 104a has no available A or V bandwidth. Accordingly, it sends a request 404 to server 2 104b, with the values {1, 0, 0}. However, server 2 104b has no audio bandwidth available. In addition, server 2 104b does not have any normal bandwidth to borrow from. Accordingly, server 2 104b sends a response 504 with the values {0, 0, 0}. Server 1 104a then sends a request 404 with the values {1, 0, 0} to server 3 104c. Server 3 104c has no audio bandwidth available, but can borrow from its video bandwidth allocation. Accordingly, it borrows one from the video pool $BW_2$, incrementing the borrowed value B in the process. Then it responds to server 1 104a with a response 504 containing the values {1, 0, 0}. Server 1 104a uses this new bandwidth from the first bandwidth pool $BW_1$ to complete the call. The end result is illustrated in FIG. 8D.

Example 2

Figure 8E:
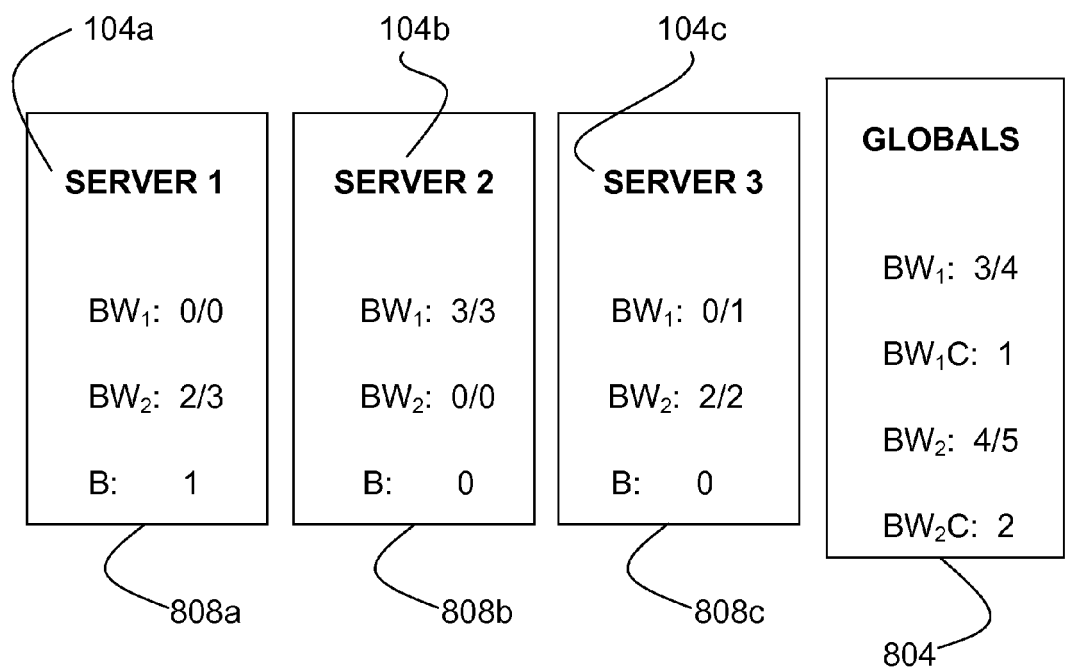

Starting from the configuration illustrated in FIG. 8B, server 1 104a and server 3 104c have their audio calls end, so they each have one unit of audio bandwidth ($BW_1$) available. Server 1 104 a now needs to make a video call. Server 1 104a determines that it has no video bandwidth ($BW_2$) available. It tries to unborrow from its priority bandwidth $BW_1$, but its borrowed value is zero. Accordingly, it sends a request 404 to server 2 104b with the values {1, 2, 2}. Here, only one unit of bandwidth from the first bandwidth pool $BW_1$ is requested, because server 1 104a can only make use of up to one more unit of bandwidth from the priority pool. Server 2 104b sends a response 504 with the values {0, 0, 2}, indicating that it is giving two borrowed units to server 1 104a. Server 1 104a reevaluates its current allocations, and given that it has one unit of $BW_1$ available, no bandwidth from $BW_2$ available, and two borrowed units available, server 1 104a converts the one unit of $BW_1$ to $BW_2$ using the shared borrowed bandwidth, yielding the allocation illustrated in FIG. 8E.

Figure 8F:
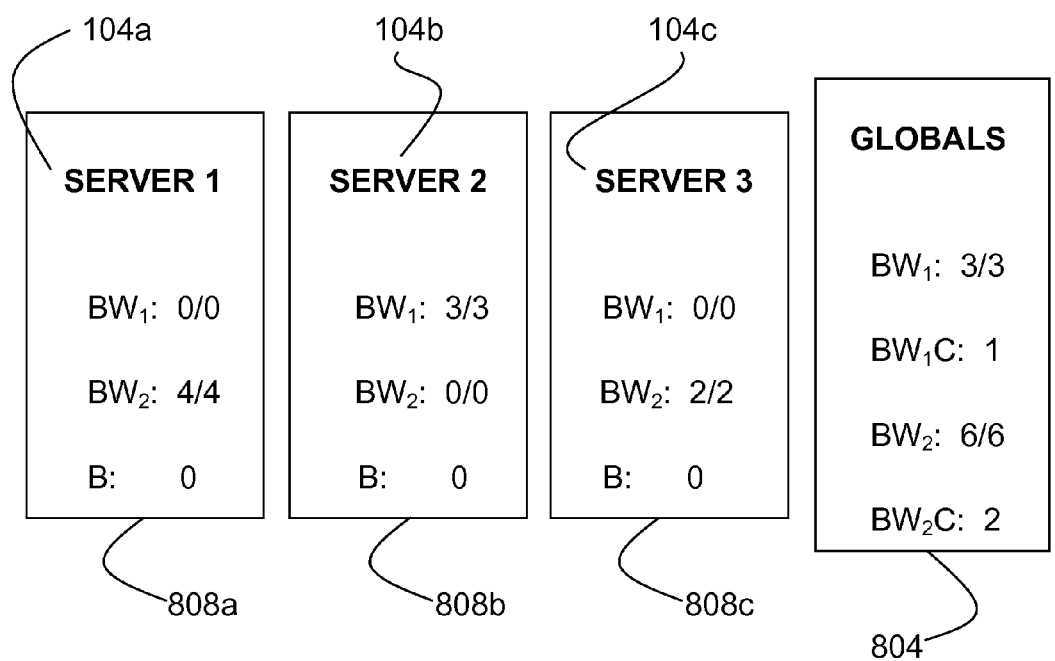

Server 1 104a still requires an additional unit of bandwidth to complete the video call. Accordingly, it sends a request 404 to server 3 104c with the values {1, 1, 0}. This is because one unit of bandwidth from the normal pool $BW_2$ is required, because server 1 104a could use a unit of priority bandwidth, but cannot use any borrowed bandwidth to satisfy this request. Server 3 104c sends a response 504 with the values {1, 0, 0}. Server 1 104a again reevaluates its bandwidth allocations, and converts a unit of bandwidth in the priority pool $BW_1$ to a unit of normal bandwidth $BW_2$ by applying the borrowed bandwidth. Server 1 104a can now complete its video call. The result after applying the bandwidth to the video call is illustrated in FIG. 8F.

Example 3

Figure 8G:
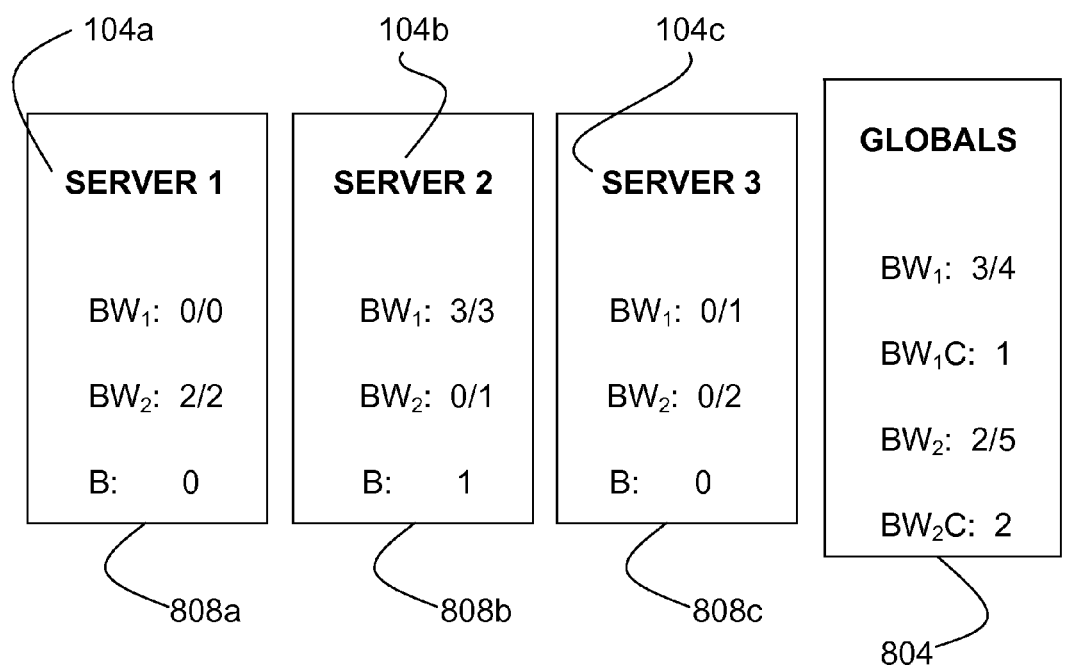

Again starting from the configuration illustrated in FIG. 8B, server 1 104a has its audio call end, and server 3 104c has all of its calls end. Server 2 104b needs to make a video call. Server 2 104b determines that it has no video bandwidth $BW_2$ available and cannot unborrow local audio bandwidth $BW_1$. It sends a request 404 to server 1 104a with the values {2, 2, 0}, because server 2 104b cannot make use of any borrowed bandwidth. Server 1 104a sends a response 504 with the values {1, 0, 0}, offering one unit of audio bandwidth $BW_1$. Server 2 104b reevaluates itself, converting one unit of priority bandwidth $BW_1$ to normal bandwidth $BW_2$ by decrementing B. The system 100 bandwidth allocations resulting after this conversion by server 2 104b is illustrated in FIG. 8G.

Figure 8H:
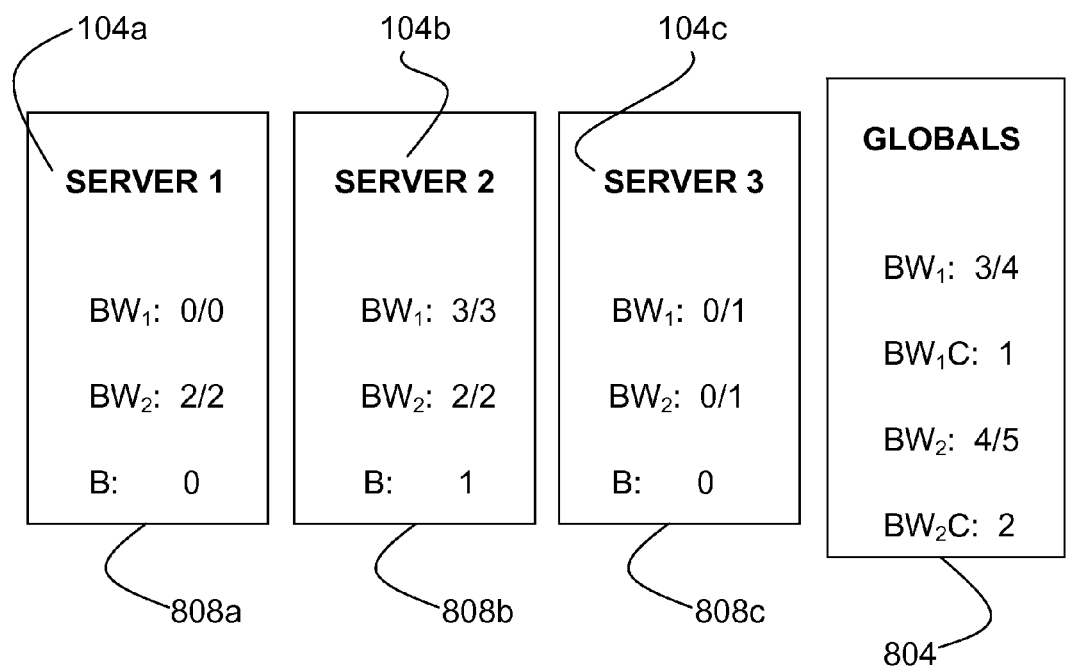

Server 2 104b still requires an additional unit of normal bandwidth $BW_2$ to complete the video call. Accordingly, it sends a request 404 to server 3 104c with the values {1, 1, 0}. This request 404 is sent because server 2 104b needs one unit of normal bandwidth $BW_2$, it could use one unit of priority bandwidth $BW_1$, by cannot use any borrowed bandwidth. Server 3 104c sends a response {0, 1, 0}, because when both priority $BW_1$ and normal $BW_2$ bandwidth is requested, normal bandwidth $BW_2$ is preferred. Server 2 104b reevaluates its bandwidth allocation, and can now complete the video call. The system 100 bandwidth allocation resulting after completion (i.e., servicing) of the video call by server 2 104b is illustrated in FIG. 8H.

Example 4

Figure 8I:
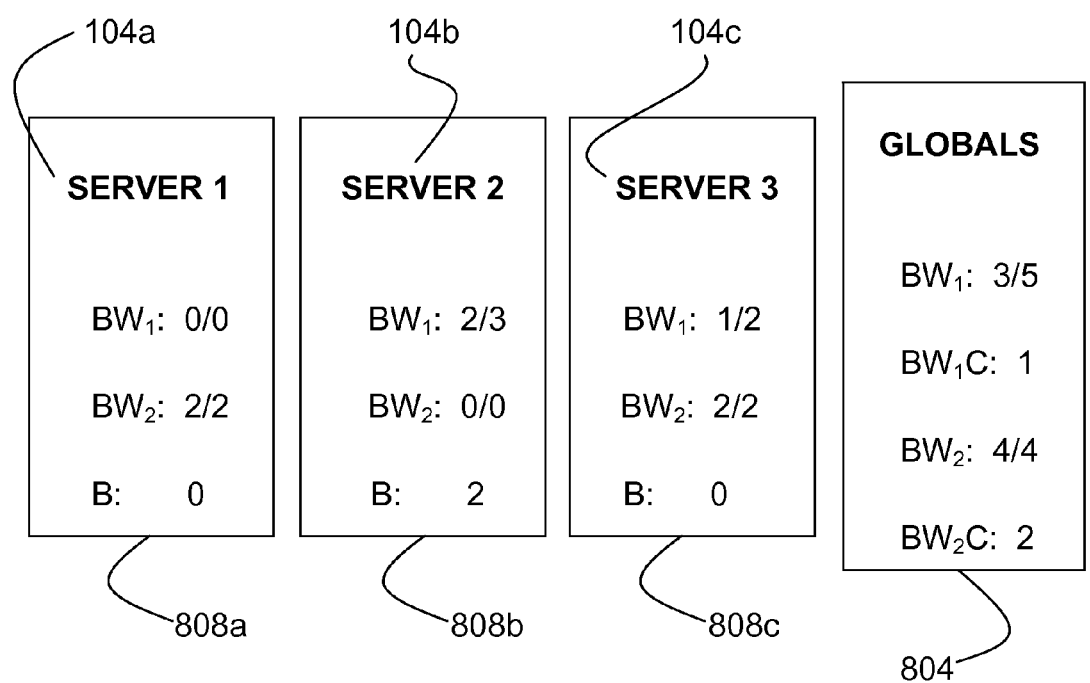

Again starting from the configuration illustrated in FIG. 8B, server 1 104a and server 2 104b each have audio calls end. Server 3 104c now needs to make a video call. Server 3 104c determines that it has no video bandwidth available, and cannot unborrow local audio bandwidth. It sends a request 404 for bandwidth to server 1 104a, with the values {2, 2, 2}. Server 1 104a sends a response 504 with the values {1, 0, 0}, offering one unit of priority or audio bandwidth $BW_1$. Server 3 104c reevaluates its bandwidth allocation, but is unable to make any changes to its available normal or video bandwidth $BW_2$. The system 100 bandwidth allocation of this point is illustrated in FIG. 8I.

Figure 8J:
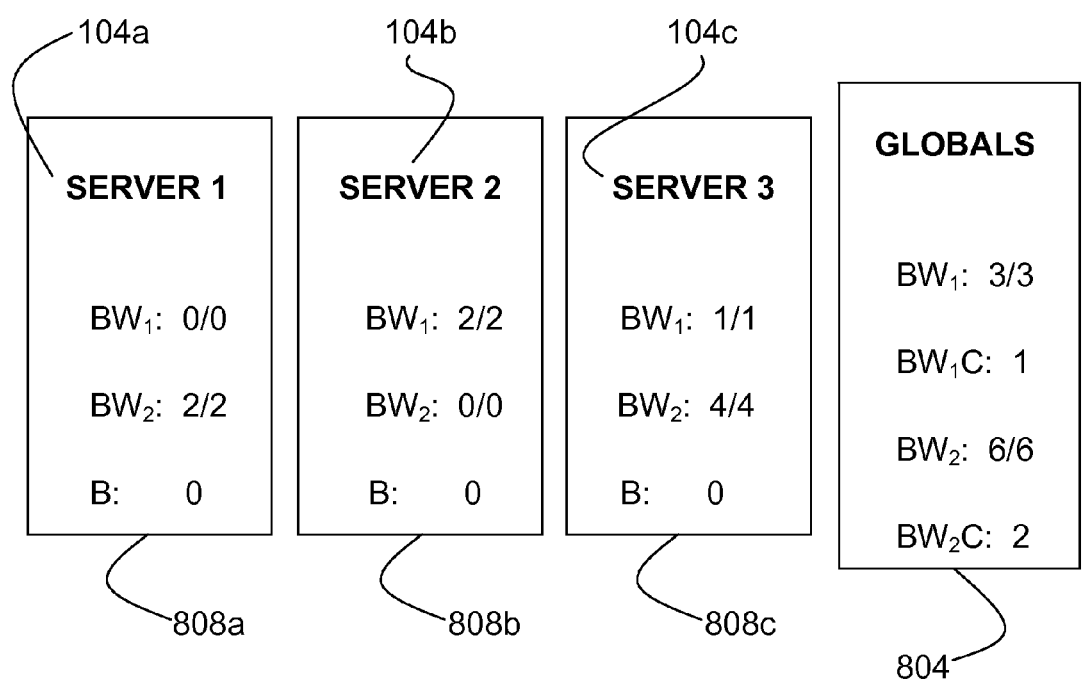

Next, server 3 104c sends a request 404 to server 2 104b, with the values {1, 2, 2}. This is because server 3 104c needs two units of video or normal bandwidth $BW_2$, can use only one unit of priority or audio bandwidth $BW_1$, and can use two borrowed units of bandwidth. Server 2 104b responds by first internally unborrowing video or normal bandwidth from the audio or priority bandwidth $BW_1$, and decrementing the borrowed value. Server 2 104b then returns a response 504 with the values {0, 1, 1}, giving up both the newly created share of normal or video bandwidth $BW_2$, and its other borrowed bandwidth share. Server 3 104c again reevaluates its bandwidth allocation. Now it can convert a priority or audio bandwidth share $BW_1$ to a normal or video $BW_2$ share by decrementing the borrowed value. This allows server 3 104c to complete the video call. The resulting system 100 bandwidth allocation, with the newly completed video call in progress, is illustrated in FIG. 8J.

Throughout the foregoing examples, it can be appreciated that the total system 100 bandwidth, as reflected in the table of global bandwidth allocation 804, remains constant. In particular, the total available bandwidth never exceeds nine. In addition, the global minimum allocation of priority bandwidth $BW_1$ of three is always maintained or exceeded, and the global maximum value of normal bandwidth $BW_2$ of six is never exceeded. Accordingly, embodiments of the disclosed invention allow for the maintenance of system 100 bandwidth parameters, and the sharing of bandwidth between servers 104, without requiring a central authority for the implementation and administration of flexible bandwidth allocations with respect to individual servers.

As noted previously, embodiments of the present disclosure can be applied in connection with any resource limited system. In particular, any system that utilizes resources where those resources or users of those resources can be divided into two or more categories, embodiments of the present disclosure can be applied to allocate the resources. More particularly, embodiments of the present disclosure allow such allocation of resources in systems with multiple authorities, while allowing total resource allocation limits for the system to be enforced. Moreover, borrowing between resource and/or user categorizations, and sharing allocated resources between authorities, are supported.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for allocating resources, comprising:
defining a plurality of resource pools, wherein a first resource pool in the plurality of resource pools is a priority resource pool, wherein the priority resource pool has a first maximum pool size, wherein a second resource pool in the plurality of resource pools is a normal resource pool, wherein the normal resource pool has a second maximum pool size, and wherein the first maximum pool size is greater than the second maximum pool size;
assigning an initial resource allocation from the plurality of resource pools to each of a plurality of servers;
receiving a request for resources at a first server included in the plurality of servers;
identifying a first one of the first or second resource pools associated with the request;
in response to determining that the first server does not have resources currently allocated from the resource pool associated with the request available, perform at least one of:
reallocating at least some of the requested resources from one of the first or second resource pools to the other of the first and second resource pools; and
requesting at least some of the requested resources from a second server included in the plurality of servers; and
in response to determining that the request cannot be satisfied from resources currently allocated to the first server:
sending a first request for shared resources to a third server included in the plurality of servers;
wherein the request for shared resources includes a maximum amount of priority resources that the first server could use, a maximum amount of normal resources that the first server could use, and a maximum amount of borrowed resources that the first server could use.

2. The method of claim 1, wherein in response to determining that the first server does not have resources allocated from the resource pool associated with the request available the method includes:
reallocating the requested resources from another resource pool.

3. The method of claim 2, wherein reallocating the requested resources from another resource pool includes:
determining that the resource pool associated with the request is the priority resource pool;
determining that resources from the allocation made to the first server from the normal resource pool is available;
incrementing a priority resource count associated with the first server;
incrementing a borrowed resource count associated with the first server; and
decrementing a normal resource count associated with the first server.

4. The method of claim 2, wherein reallocating the requested resource from the another resource pool includes:
determining that the resource pool associated with the request is the normal resource pool;
determining that a borrowed resource count associated with the first server is greater than zero;
determining that an available priority resource count for the first server is greater than zero;
decrementing the borrowed resource count for the first server;
decrementing an available priority resource count for the first server; and
incrementing a total normal resource count for the first server, wherein resources are reallocated from the priority resource allocation for the first server to the normal resource allocation for the first server.

5. The method of claim 1, further comprising:
in response to receiving the first request for shared resources, the third server releasing unused resources to the first server, wherein resources are reallocated between the first and the third servers.

6. The method of claim 5, wherein the priority resource pool has a minimum pool size, wherein a sum of the minimum pool size of the priority resource pool and the maximum pool size of the normal resource pool equals total system resources, and wherein the reallocation of resources between the first and the third servers does not change the total system resources.

7. The method of claim 6, wherein the third server reallocating unused resources to the first server includes the third server:
determining an amount of requested normal resources that can be reallocated to the first server;
determining an amount of requested borrowed resources that can be reallocated to the first server;

determining an amount of requested priority resources that can be reallocated to the first server.

8. The method of claim 7, further comprising:
in response to receiving reallocated resources from the third server, the first server applying the reallocated resources.

9. The method of claim 8, further comprising:
in response to the received allocated resources being insufficient to satisfy the request for resources made to the first server, the first server sending a second request for shared resources to a fourth server.

10. The method of claim 1, wherein the request for resources received at the first server is for priority resources, wherein the first request for shared resources sent to the third server by the first server requests zero normal resources.

11. The method of claim 1, further comprising:
the first server assigning the requested resources to satisfy the request.

12. The method of claim 1, wherein the plurality of resource pools are resource pools of electrical power.

13. The method of claim 12, wherein the first resource pool is a resource pool of renewable energy resources and the second resource pool is a resource pool of non-renewable resources.

14. A system for administering resources, comprising:
at least a first network;
two or more branches;
a plurality of servers, wherein each server is associated with one of the branches, and wherein the servers are in communication with one another and are interconnected to the first network, each server including:
data storage, including:
a control table, wherein the control table defines a plurality of resource pools, wherein a first resource pool in the plurality of resource pools is a priority resource pool, wherein the priority resource pool has a first maximum pool size, wherein a second resource pool in the plurality of resource pools is a normal resource pool, wherein the normal resource pool has a second maximum pool size, and wherein the first maximum pool size is greater than the second maximum pool size;
a resource allocation application, wherein the resource allocation assigns an initial resource allocation from the plurality of resource pools to each of the plurality of servers, receives a request for resources at a first server included in the plurality of servers, identifies a first one of the first or second resource pools associated with the request, and in response to determining that the first server does not have resources allocated from the resource pool associated with the request available, the resource allocation application perform at least one of:
reallocates at least some of the requested resources from one of the first or second resource pools to the other of the first or second resource pools; and
requests at least some of the requested resources from a second server included in the plurality of servers; and
a resource application in the first server of the plurality of servers that, in response to determining that a request cannot currently be satisfied from resources allocated to the first server, sends a request message over the first network to a third server, and wherein the request message includes a maximum amount of priority resources that the first server could use, a maximum amount of normal resources that the first server could use, and a maximum amount of borrowed resources that the first server could use.

15. The system of claim 14, wherein total system resources are held constant.

* * * * *